(12) United States Patent
Moroto et al.

(10) Patent No.: US 7,157,828 B2
(45) Date of Patent: Jan. 2, 2007

(54) FUEL PUMP FOR HIGH TORQUE IN COMPACT STRUCTURE

(75) Inventors: Kiyonori Moroto, Kariya (JP); Motoya Ito, Hekinan (JP); Eiji Iwanari, Chiryu (JP)

(73) Assignee: Denso Corporation (JP)

( * ) Notice: Subject to any disclaimer, the term of this patent is extended or adjusted under 35 U.S.C. 154(b) by 251 days.

(21) Appl. No.: 10/417,270

(22) Filed: Apr. 17, 2003

(65) Prior Publication Data
US 2003/0202893 A1 Oct. 30, 2003

(30) Foreign Application Priority Data
Apr. 30, 2002 (JP) ............................ 2002-128670
Feb. 24, 2003 (JP) ............................ 2003-045412

(51) Int. Cl.
*H02K 1/22* (2006.01)

(52) U.S. Cl. .............. 310/261; 310/217; 310/152; 310/71; 310/62; 310/270; 310/234

(58) Field of Classification Search ........ 310/216–218, 310/261–270, 154.01–154.49, 152, 71, 234, 310/233, 61–63, 60 R; 417/423.7
See application file for complete search history.

(56) References Cited

U.S. PATENT DOCUMENTS

| 3,836,291 | A | * | 9/1974 | Bottcher et al. ........... 415/55.1 |
|---|---|---|---|---|
| 4,619,588 | A | * | 10/1986 | Moore, III ................... 417/366 |
| 4,812,692 | A | * | 3/1989 | Arita ........................ 310/49 R |
| 4,835,839 | A | | 6/1989 | Forbes et al. ................. 29/596 |
| 5,115,174 | A | | 5/1992 | Masuda et al. ............. 318/254 |
| 5,607,293 | A | | 3/1997 | Luedtke ...................... 417/423 |
| 5,971,687 | A | | 10/1999 | Ito et al. ..................... 411/238 |
| 6,157,110 | A | * | 12/2000 | Strobl ........................ 310/261 |
| 6,218,761 | B1 | * | 4/2001 | Richter et al. ............. 310/264 |
| 6,326,748 | B1 | | 12/2001 | Moroto et al. ............. 310/254 |
| 6,335,581 | B1 | | 1/2002 | Warnke ....................... 310/87 |
| 6,787,966 | B1 | * | 9/2004 | Haga .......................... 310/269 |
| 6,880,229 | B1 | * | 4/2005 | Zepp et al. .................. 29/596 |

FOREIGN PATENT DOCUMENTS

JP 7-85642 9/1995
JP 2001-275327 10/2001

OTHER PUBLICATIONS

Office Action in Chinese Appln. No. 03124063.1, dated Jun. 1, 2005 with translation.
Office Action in Korean Appln. No. 10-2003-0025666, dated Feb. 16, 2006, with translation.

* cited by examiner

*Primary Examiner*—Dang Le
(74) *Attorney, Agent, or Firm*—Nixon & Vanderhye PC

(57) ABSTRACT

In a fuel pump, four permanent magnets are installed in a housing. An armature is installed inside the permanent magnets rotatably. Six magnetic pole coil portions of the armature are installed in a central core. Each magnetic pole coil portion has a coil core, a bobbin and a coil formed by winding a winding on the bobbin in a concentrated winding form. Each coil core has an outer region in opposition to the permanent magnet in a direction of revolution, and a board-shaped coil-winding portion extending from the outer region toward the central core. Each bobbin covers the coil core except for the outer surface of the outer region and a convex portion.

26 Claims, 10 Drawing Sheets

FUEL PUMP FOR HIGH TORQUE IN COMPACT STRUCTURE

CROSS REFERENCE TO RELATED APPLICATION

This application is based on and incorporates herein by reference Japanese Patent Applications No. 2002-128670 filed on Apr. 30, 2002 and No. 2003-45412 filed on Feb. 24, 2003.

FIELD OF THE INVENTION

The present invention relates to a fuel pump that supplies fuel sucked from a fuel tank to an internal combustion engine.

BACKGROUND OF THE INVENTION

In a fuel pump for sucking a fuel from a fuel tank and supplying the fuel to an engine, plural permanent magnets are positioned along a circumference of its housing, and an armature is set inside the permanent magnets rotatably. In this way, a driving motor is installed in the fuel pump (in JP-B2-7-85642). In the armature, plural magnetic pole coil portions are formed in a direction of revolution. Each of the magnetic pole coil portions is made by winding a coil on a bobbin, which covers a coil core made of a magnetic material, in a distributed winding form. By supplying electricity from a commutator divided into plural segments to the coils respectively, repulsion or attraction between the permanent magnets and the armature is generated. Thus, since torque is generated in the armature, the armature revolves.

To increase the torque generated in the armature, the amount of discharged fuel and pressure of the discharged fuel, it is considered that the number of windings wound on each bobbin is increased by enlarging spaces for windings by enlarging an outer diameter of the armature. However, the fuel pump is enlarged.

Moreover, it is preferable that the fuel pump is made small by restriction of a space to install the fuel pump. For example, when the fuel pump is installed in a flat-shaped fuel tank, it is preferable that an axial length of the fuel pump is made short. However, when the axial length of the fuel pump is made short without enlarging a diameter of the fuel pump, magnetic fluxes passing through the core decrease. In this case, the generated torque drops.

SUMMARY OF THE INVENTION

It is an objective of the present invention to provide a fuel pump, which provides high torque in compact structure and in which windings can be wound easily. That is, the fuel pump can be made small without reducing torque, or the torque of the fuel pump can be increased without enlarging its body. Moreover, in the fuel pump, the windings can be wound easily. Another objective of the present invention is to provide a fuel pump, in which plural coils can be connected easily.

To achieve the objective of the present invention, each coil core is a separate body from a central core. Therefore, each coil core can be coupled with the central core after each bobbin covering each coil core is wound by a winding in a concentrated winding form. Each winding can be wound on each bobbin of each magnetic pole coil portion in regular form easily, so that a percentage of winding occupying volume increases. The percentage of the winding occupying volume is a ratio of total spaces occupied by the windings to total spaces for the windings formed by the bobbins. Moreover, in comparison with a distributed winding form in which the plural bobbins are wound by the windings successively, the windings do not intersect one another between the bobbins in the concentrated winding form. Beside, the percentage of the winding occupying volume is increased. Therefore, in a case that an axial length of the fuel pump and the outer diameter of the fuel pump are same, even though a diameter of each winding is large, the winding can be wound on each bobbin in a winding number same as small diameter's one. Furthermore, by enlarging the diameter of each winding, since resistance of the windings drops, and the amount of current passing through the windings increases, the generated torque increases. As a result, the amount of the supplied fuel can be increased.

When the generated torque is not increased, the number of the wound windings can be decreased. Thus, inductance of the coils drops. Provided the inductance drops, voltage, which is generated in the coils when the segments of the commutator separate from brushes by a revolution of the armature, drops. Therefore, it is prevented that sparks are generated among the segments of the commutator or between the commutator and the brushes. Thus, abrasion of the commutator and the brushes can be reduced.

Moreover, when the generated torque is not increased, the spaces for the windings can be reduced. Therefore, the fuel pump can be made small. For example, in a case that the fuel pump is stored in a fuel tank installed in a vehicle, even though the fuel tank is flat-shaped, the fuel pump can be stored in the flat-shaped fuel tank easily by shortening the axial length of the fuel pump.

The fuel sucked by a suction force is discharged from a fuel discharge outlet through a clearance space formed between the permanent magnets and the armature. A space, which is formed for storing the armature inside the permanent magnets rotatably, also functions as a fuel passage. Therefore, the fuel passage for fuel flowing in the fuel pump can be ensured without enlarging the fuel pump.

The permanent magnets installed circularly along a circumference of the armature form different magnetic poles alternately. The number of the permanent magnets is equal to four or more than four and an even number. Since many magnetic poles formed by the permanent magnets are formed, thicknesses of the permanent magnets and a housing can be made thin. Moreover, since the space for storing the armature can be made large without enlarging the outer diameter of the fuel pump, the spaces for windings formed by the bobbins can be made large. Consequently, provided volume of the space for the windings is not changed, by shortening axial length of the fuel pump, the windings can be wound in a predetermined number.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

[First Embodiment]

Figure 1:
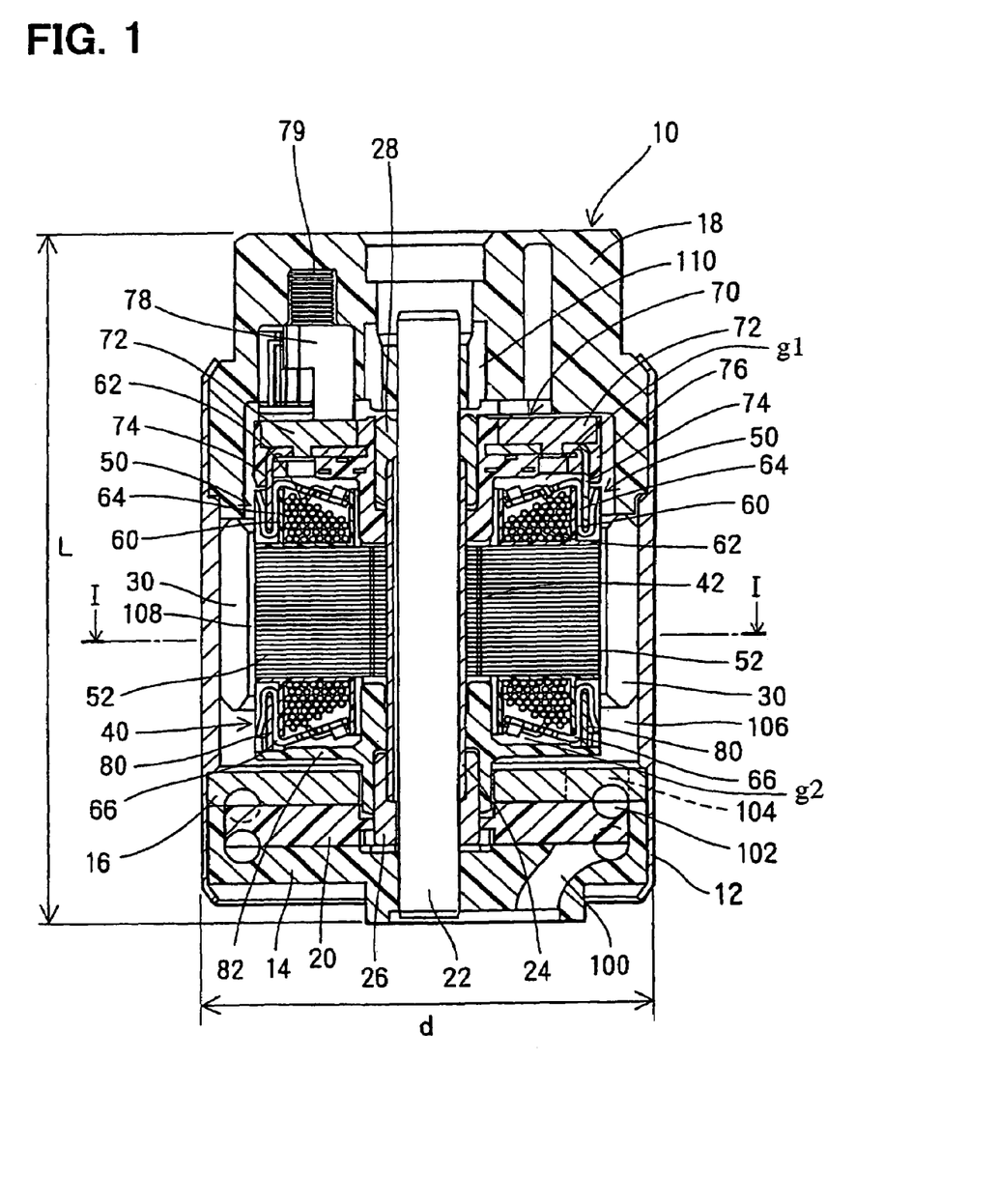
FIG. 1 is a horizontal sectional view of the fuel pump according to the first embodiment of the present invention.

A fuel pump 10 in FIG. 1 is an ink-tank pump. For example, the ink-tank pump is installed in a fuel tank of a vehicle. A housing 12 fixes a suction-side cover 14 and a discharge-side cover 18 by swaging.

A pump casing 16 is supported by the suction-side cover 14 and the housing 12. Between the suction-side cover 14 and the pump casing 16, a C-shaped pump channel 102 is formed. The suction-side cover 14 and the pump casing 16 support an impeller 20 serving as a suction force generation means rotatably.

In an outside edge of the disk-shaped impeller 20, a number of vane-grooves are formed. When the impeller 20 revolves with an armature 40, a pressure difference is generated by a fluid friction in front and behind of the vane-grooves. By repeating this in the vane-grooves, the fuel in the pump channel 102 is pressurized. Fuel sucked by revolution of the impeller 20 from the fuel tank through a fuel suction inlet 100 formed in the suction-side cover 14, flows into a motor chamber 106 through the pump channel 102 and a connecting passage 104 formed in the pump casing 16. Moreover, the fuel is discharged from the pump 10 to an engine through a fuel passage 108, which is a clearance space formed between inner surfaces of permanent magnets 30 and an outer surface of the armature 40, and a fuel discharge outlet 110 formed in the discharge side cover 18 around one end of a shaft 22.

The shaft 22 serving as a fixed revolution shaft of the armature 40 is supported and fixed by the suction-side cover 14 and the discharge-side cover 18. A pipe 24 is attached on the circumference of the shaft 22 rotatably. Bearings 26 and 28 are engaged with the circumference of the pipe 24 and revolve with the pipe 24.

Four permanent magnets 30 that form shapes of quarter arcs are installed on an inner surface of the housing 12 circularly. The permanent magnets 30 form four different magnetic poles alternately in the direction of revolution. Each inner surface 31 of the permanent magnet 30 forms a shape of a smooth concave arc.

Figure 2:
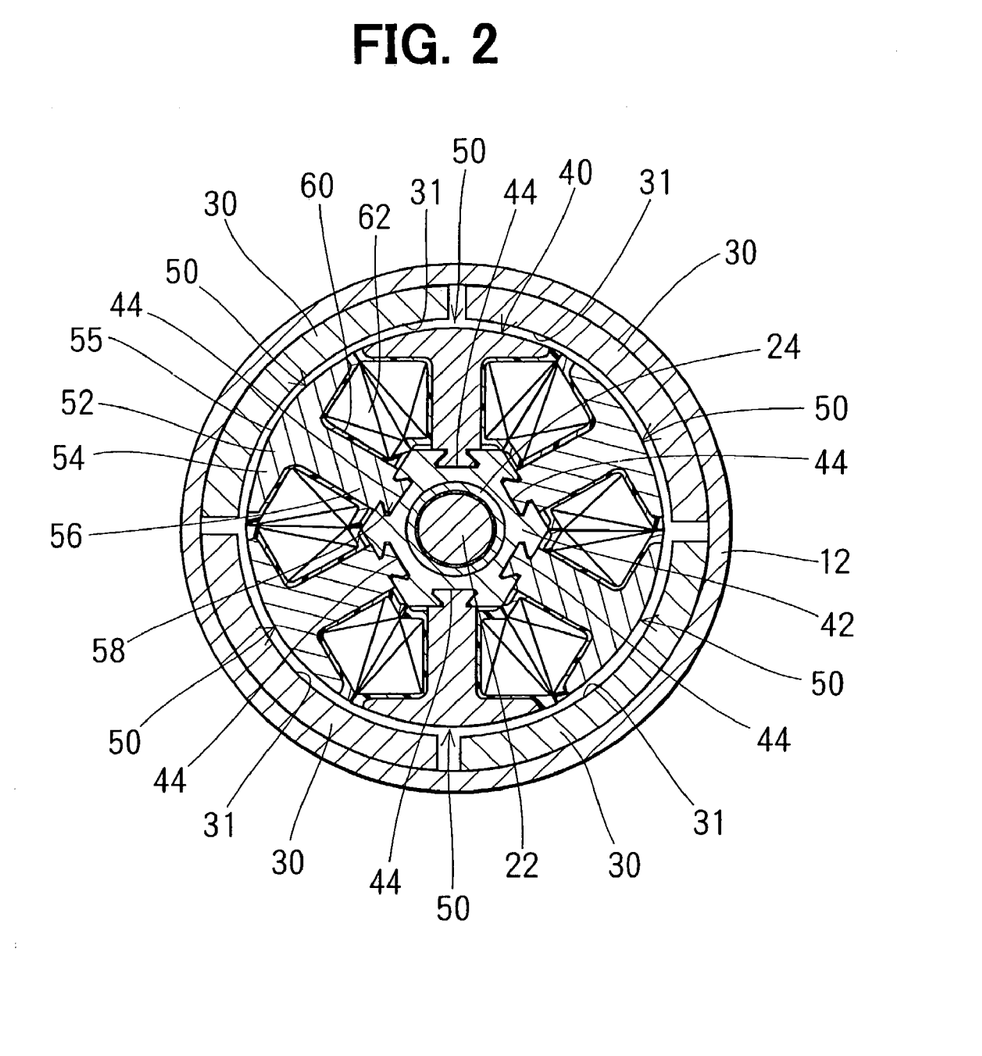
FIG. 2 is a cross sectional view of the fuel pump according to the first embodiment taken along a line I—I of FIG. 1.

The armature 40 revolves with the pipe 24 and the bearings 26, 28 with using the shaft 22 as the fixed revolution shaft. As shown in FIG. 2, the armature 40 has a central core 42 in the center of revolution. The central core 42 forms a shape of a substantially hexagonal cylinder. Moreover, six hexagonal outer surfaces of the central core 42 have concave portions 44, which extend in the longitudinal direction of the shaft 22, respectively. The width of each concave portion 42 gets narrow toward the outside in the direction of a radius.

Six magnetic pole coil portions 50 are installed around a circumference of the central core 42 in the direction of revolution. Each magnetic pole coil portion 50 has a coil core 52, a bobbin 60 and a coil 62, which is formed by winding a winding on the bobbin 60. The coil cores 52 and the outer surfaces of the bobbins 60 form the most outer surface of the armature 40. Since the structures of the six magnetic pole coil portions 50 are the same, some of reference numerals, which show the same parts in FIG. 2, are omitted.

The coil cores 52 have outer regions 54 in opposition to the permanent magnets 30 along the direction of revolution and coil-winding portions 56, which extend from the outer regions 54 toward the central core 42 and form shapes of boards respectively. A cross section of each coil core 52 in the vertical direction of the shaft 22 is T-shaped. An outer surface 55 of each outer region 54 forms a shape of a smooth convex arc. A clearance between the outer surfaces 55 of the outer regions 54 and the inner surfaces 31 of the permanent magnets 30 is uniform in the direction of revolution. Each coil-winding portion 56 has a convex portion 58 extending in the longitudinal direction of the shaft 22 in the side opposite to the central core 42. The width of each convex portion 54 gets large toward the central core 42. Each convex portion 58 is engaged with the concave portion 44 by being inserted to the concave portion 44 in the longitudinal direction of the shaft 22.

Each bobbin 60 covers a part of the coil core 52 excluding the outer surface 55 of the outer region 54 and the convex portion 58. By the bobbins 60, the outer regions 54 of the coil cores 52, which are contiguous one another in the direction of revolution, are magnetically insulated. In the cross section of the armature 40 taken vertically with its axis, the coil-winding portions 56 are put between the bobbins 60 respectively, and the bobbins 60 form substantially trapezoidal spaces for the windings. The width of each substantially trapezoidal space for the winding gets narrow from the outer regions 54 toward the central core 42. The coils 62 are formed by winding the windings in the substantially trapezoidal spaces for the windings.

As shown in FIG. 1, the end portion of each coil 62 in opposition to the commutator 70 is electrically connected to a terminal 64, and the other end portion of each coil 62 in opposition to the impeller 20 is electrically connected to the a terminal 66. As also shown in FIG. 1, a gap g1 is provided between the commutator 7 and the coils 62 of the armature. As shown in FIG. 3B, three terminals 66, which adjoin successively, are electrically connected one another by a terminal 80. That is, each terminal 80 forms a neutral point 120 (shown in FIGS. 4 and 5) connecting three coils 62 electrically. Each terminal 80 extends among three magnetic pole coil portions 50, which adjoin successively in the direction of revolution. Moreover, the terminals 80 are engaged with the terminals 66 having U-shapes. The terminals 80 are positioned outside the coils 62 and inside the outer surfaces of the bobbins 60 in the direction of the radius. Moreover, the terminals 80 overlap with the bobbins 60 in the longitudinal direction of the shaft 22.

Figure 8:
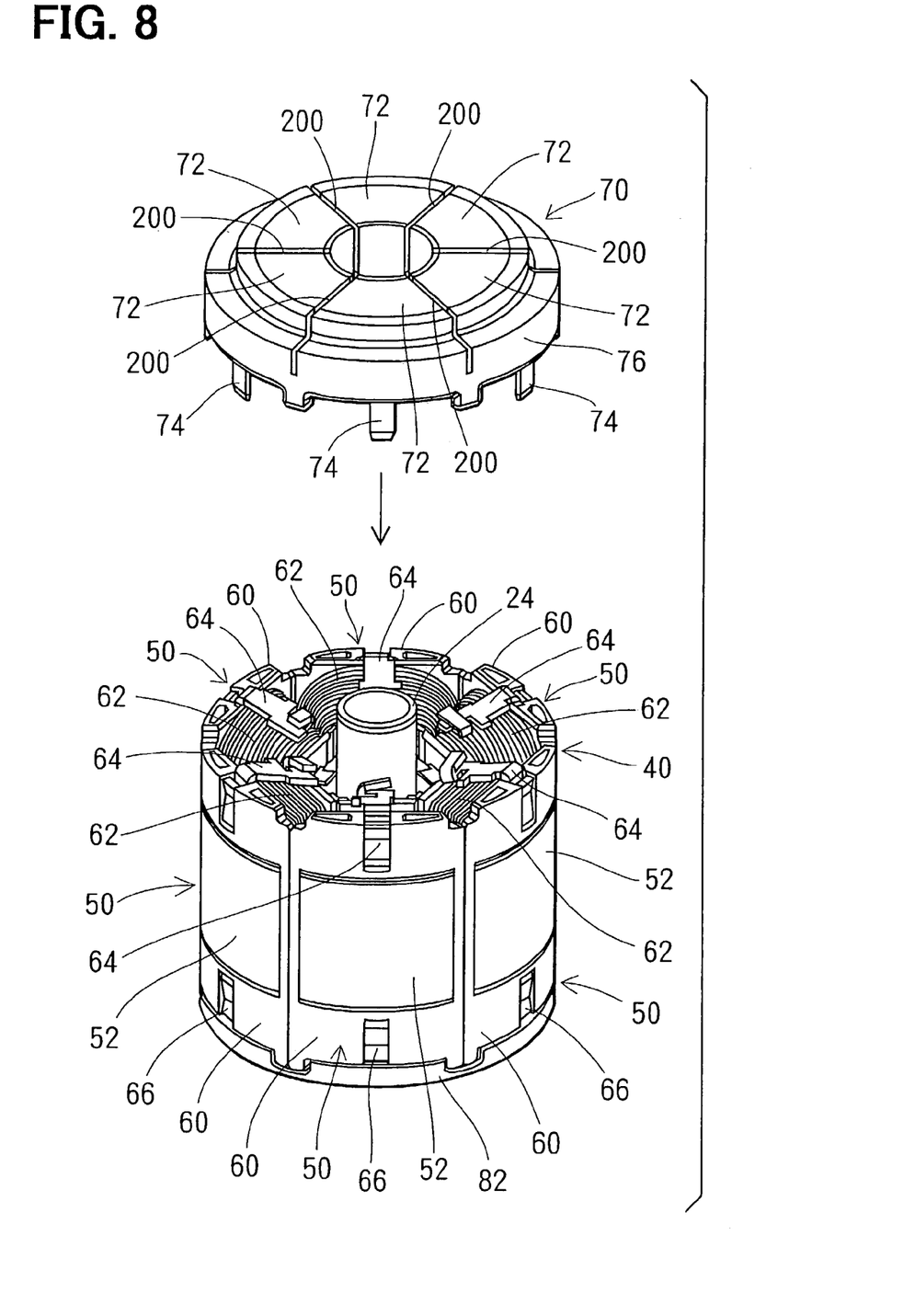
FIG. 8 is an illustration showing a connecting process between the commutator and the coils.

As shown in FIG. 8, the terminals 64 and 66 are exposed outside the bobbins 60. Therefore, in a state of fuel pump 10 that the armature 40 is assembled as shown in FIG. 8, breaks of the coils 62 and poor electrical contacts between the coils 62 and the terminals 64, 66 can be checked. Moreover, in a state that the commutator 70 and the armature 40 are combined, poor electrical contacts of the armature 40 can be checked.

As shown in FIG. 1, an imperforate cover 82 covers an opposite end to the commutator 70 of each coil 62. As also shown in FIG. 1, a gap g2 is provided between the cover 82 and coils 62 of the armature.

Figure 3A:
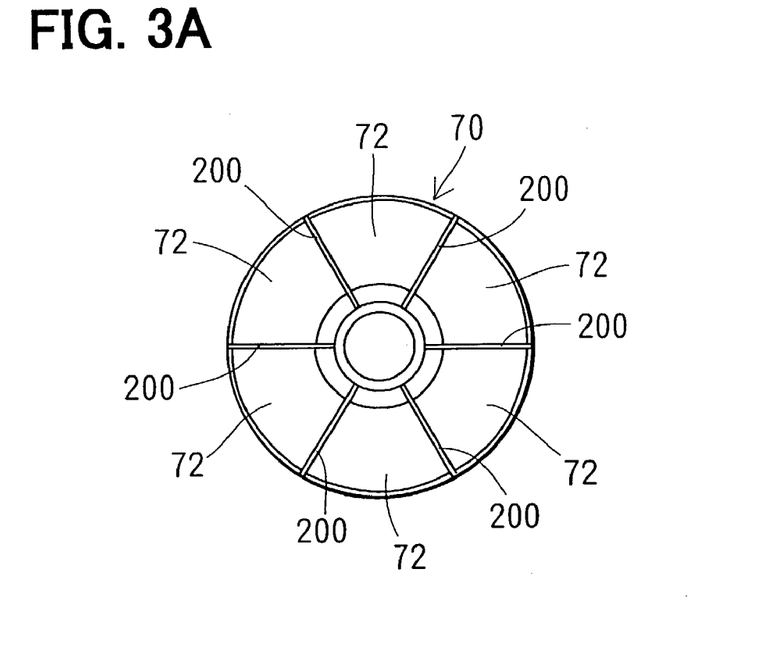
FIG. 3A is a side view of an armature viewed from a side of a commutator.
Figure 3B:
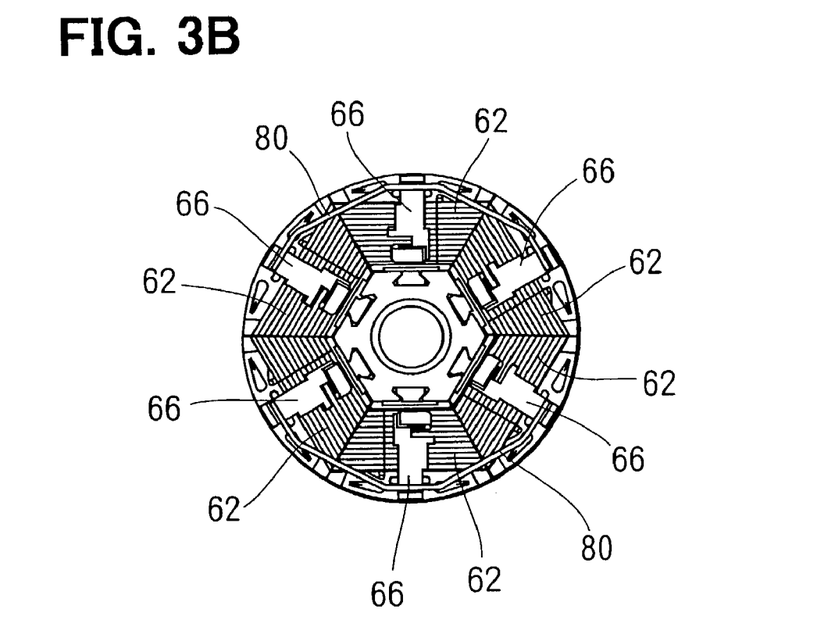
FIG. 3B is a side view of the armature viewed from a side of an impeller.
Figure 4:
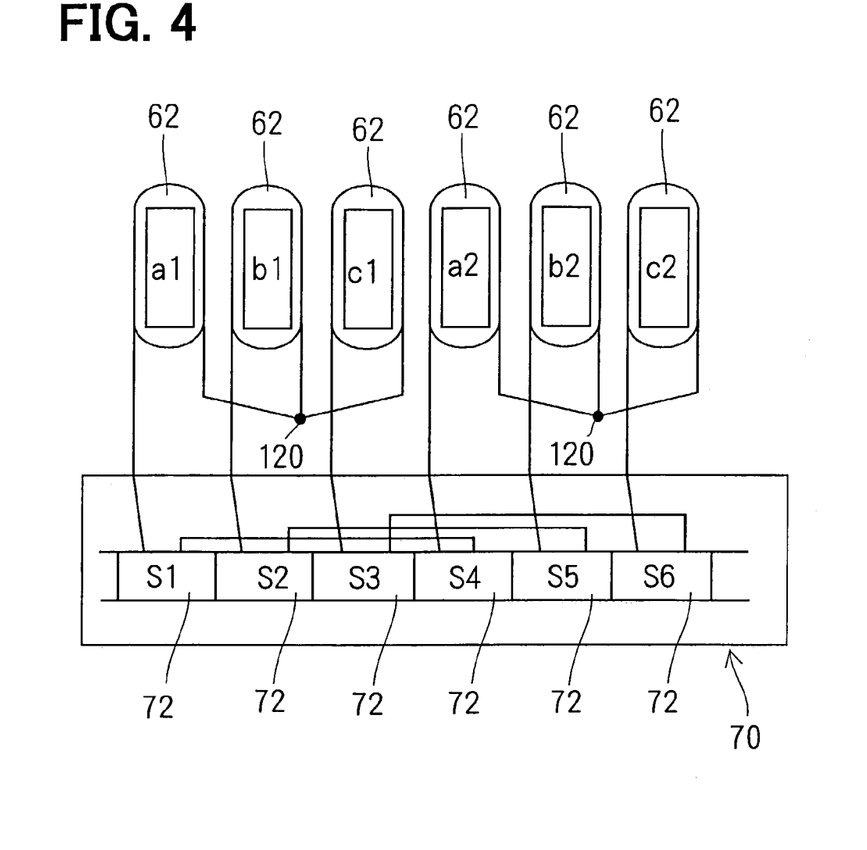
FIG. 4 is a schematic illustration showing connections of coils according to the first embodiment.

As shown in FIG. 3A, the commutator 70 has six segments 72 in the direction of revolution. The segments 72 are electrically insulated one another by gaps 200 and an insulating resin 76. Each segment 72 is electrically connected to each terminal 74 shown in FIG. 1. The terminals 74 are electrically connected to the terminals 64 of the armature 40 respectively. As shown in FIG. 4, in the commutator 70, a segment S1 and a segment S4, a segment S2 and a segment S5, and a segment S3 and a segment S6 are electrically connected respectively. The coils 62 installed in the armature 40 are arranged in the order of a1, b1, c1, a2, b2, and c2 in the direction of revolution, and the segments 72 installed in the commutator 70 are arranged in the order of s1, s2, s3, s4, s5 and s6 in the direction of revolution. Brushes 78 made of a carbon material are biased to the segments 72 by springs 79. From terminals (not shown), electricity is supplied to the coils 62 through the brushes 78, the segments 72, the terminals 74 and the terminals 64.

Figure 5:
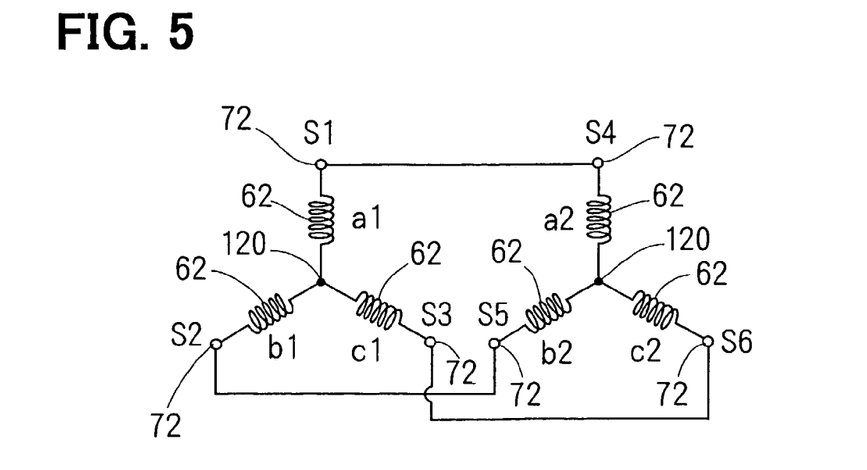
FIG. 5 is a schematic circuit diagram showing the connections of the coils according to the first embodiment.

As shown in FIG. 4, the end portion of each coil 62 in opposition to the commutator 70 and the segment 72 are electrically connected. Moreover, the opposite end portions to the commutator 70 of the coils 62 are electrically connected and form neutral points 120 of a star connection. That is, as shown in FIG. 5, there are two sets of three coils 62 connected in the star connection. In each set of three coils 62, the coils 62 are parallel-connected.

The armature 40 is manufactured as follows.

Figure 6A:
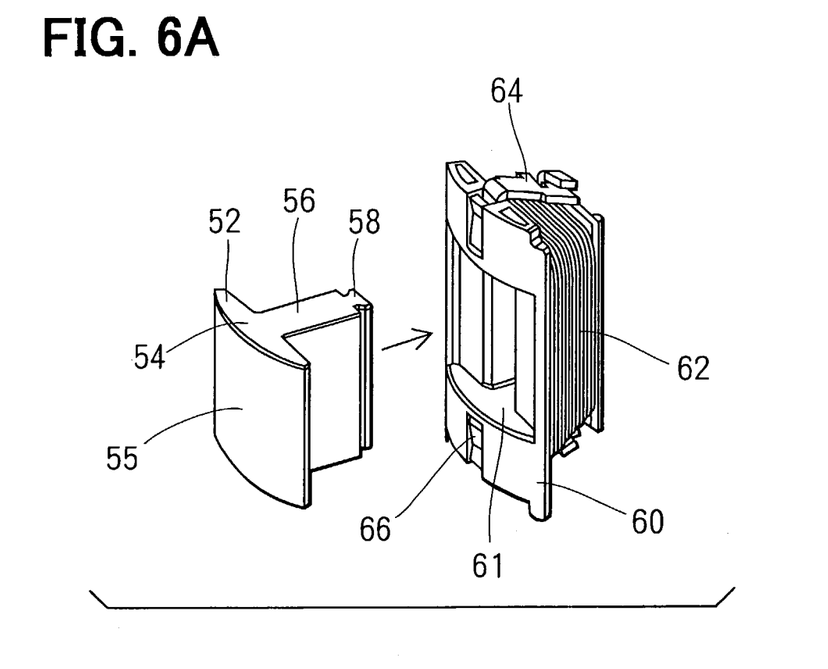
FIGS. 6A and 6B are illustrations showing a manufacturing process of a magnetic pole coil portion.
Figure 6B:
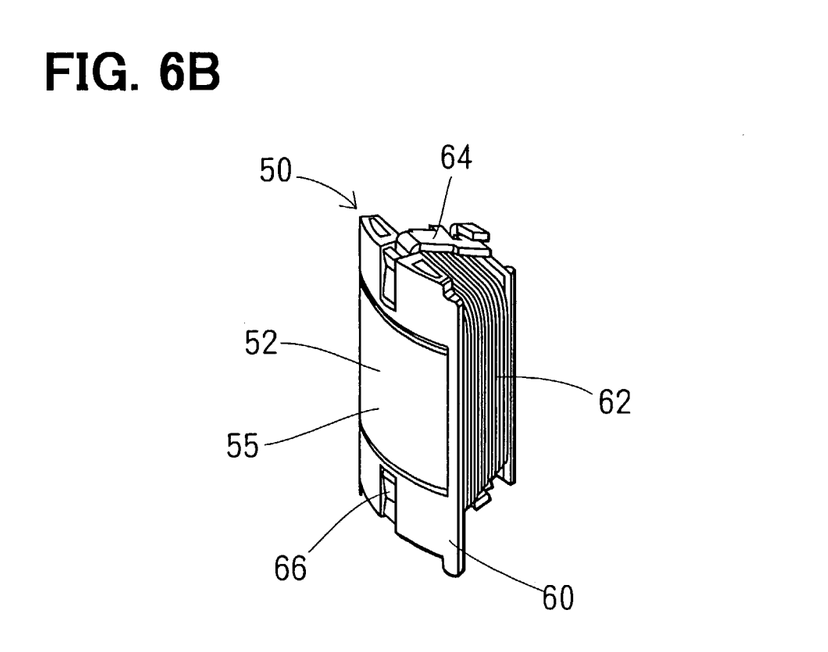

(1) As shown in FIGS. 6A and 6B, each coil 62 is made by winding the winding on the bobbin 60 made of resin. The terminal 64 and the terminal 66 are electrically connected to the coil 62.

(2) The magnetic pole coil portion 50 is made by inserting the coil-winding portion 56 of the coil core 52 to an opening portion 61 formed in a circumference portion of the bobbin 60.

Figure 7A:
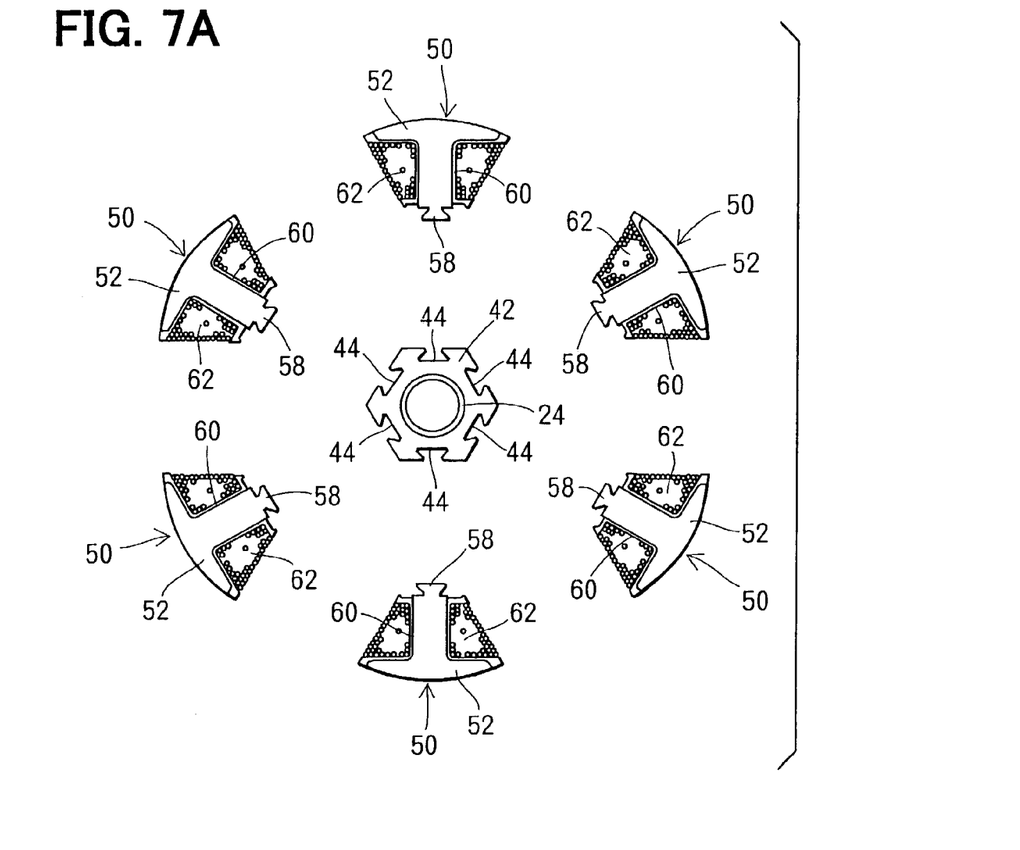
FIGS. 7A and 7B are illustrations showing an attaching method between the magnetic pole coil portions and a central core.
Figure 7B:
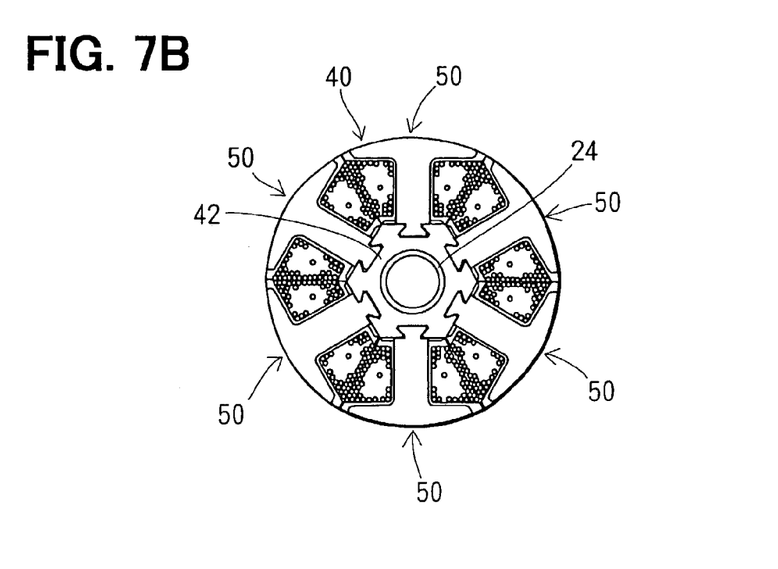

(3) As shown in FIGS. 7A and 7B, the convex portions 58 of the coil cores 52 are inserted and fixed to the concave portions 44 of the central core 42, in which the pipe 24 is inserted with force, in the longitudinal direction of the shaft 22. The armature 40 is made by engaging the magnetic pole coil portions 50 with the central core 42. As described above, the width of each concave portion 44 gets narrow toward the outside in the direction of the radius, i.e., toward the convex portion 58, and the width of each convex portion 58 gets large toward the central core 42. Moreover, the concave portions 44 and the convex portions 58 are formed with extending in the longitudinal direction of the shaft 22 continuously. Therefore, by engaging the concave portions 44 and the convex portions 58, they are fixed firmly and are not disengaged in the direction of the radius.

On the other hand, the concave portions are formed in the coil cores 52 respectively, and the convex portions for engaging with the concave portions of coil cores 52 are formed in the central core 42. Similar to this embodiment, the coil cores 52 and the central core 42 may be fixed by engaging the concave portions and the convex portions.

(4) As shown in FIG. 8, by engaging the commutator 70 with the armature 40, where the magnetic pole coil portions 50 are installed on the outside surface of the central core 42 of the armature 40 along the direction of revolution, the terminals 74 of the commutator 70 and the terminals 64 of the coils 62 are electrically connected in direct contacts. The terminals 74 are projected from the insulated resin 76 toward the magnetic pole coil portions 50, and the circumference of each terminal 64 has a U-shape approximately. The terminals 74 projecting toward the magnetic pole coil portions 50 are engaged with the U-shaped terminals 64. By that, the terminal 64 and the terminal 74 are electrically connected. As illustrated in FIG. 1 and FIG. 8, the commutator 70 and terminals 74 together define a cover adjacent to and covering one axial end surface of the armature 40. As shown in FIG. 1, this cover defines a passage for fuel to flow around the armature.

In FIG. 8, the opposite end portions to the commutator 70 of the coils 62 are covered by the cover 82. That is, the electrical connections between the terminals 80 and the terminals 66 of the coils 62 are already performed. Electrical connections between the terminals 80 and the terminals 66 of the coils 62, and an installation of the cover 82 can be performed after the commutator 70 is installed. As illustrated in FIG. 1 and FIG. 8, the cover 82 and terminals 80 together define a cover adjacent to and covering one axial end surface of the armature 40. As shown in FIG. 1, this cover defines a passage for fuel to flow around the armature.

It is desired that a fuel discharge pressure P [kPa] of the fuel pump 10 for supplying the fuel in the fuel tank to the engine is in a range of 200–600 [kPa]. Moreover, it is desired that a discharge amount Q [L/h] of the fuel pump 10 is in a range of 50–300 [L/h]. Output power of the fuel pump 10, which is calculated by maximum and minimum values of the discharged pressure P and the discharged amount Q, is in a range of 2.8–49.5 [W]. Provided the revolution speed of the armature 40 is defined as N, and the torque of the armature 40 is defined as T, pump efficiency is calculated in a mathematical expression of (P*Q)/(N*T). The value calculated in the mathematical expression of (N*T) shows motor output power of the fuel pump 10. In the fuel pump 10 shown in FIG. 1, since the value calculated in the mathematical expression of (P*Q)/(N*T) is 0.3, it is necessary that the motor output of the fuel pump 10 is in a range of 9.3–165 [W]. When the value of the revolution speed of the armature 40 is defined as 6000 rpm/min, a required range of the torque N is 0.015–0.27 [N*m]. The range of the torque used in the fuel pump 10 on average is 0.05–0.1 [N]. Provided the voltage applied to the fuel pump 10 is defined as V, and the current supplied to the fuel pump 10 is defined as I, the motor efficiency is calculated in the mathematical expression of (N*T)/(V*I). The mathematical expression of (V*I) shows electric power supplied to the fuel pump 10. In the fuel pump 10, to realize high motor efficiency, the torque T is required to be in the range of 0.05–0.1 [N*M].

Figure 9:
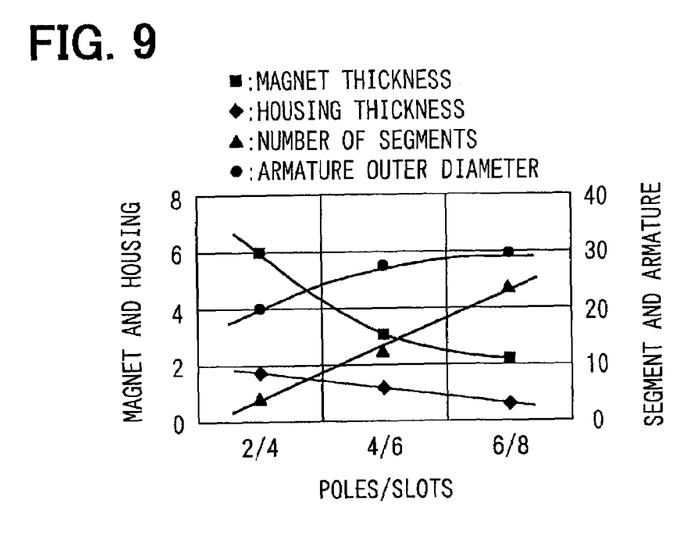
FIG. 9 is a graphic plot showing a relation of the number of poles/the number of slots—the thickness of the magnet, the thickness of the housing, the number of segments and an outer diameter of the armature.
Figure 10:
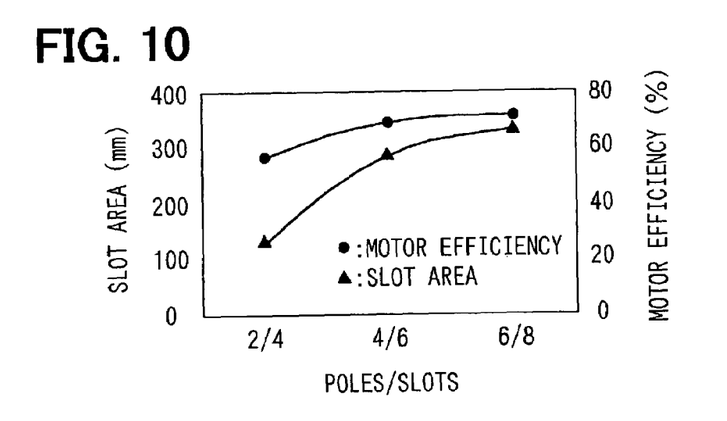
FIG. 10 is a graphic plot showing a relation of the number of the poles/the number of the slots—size of a slot area and motor efficiency.

Subsequently, a slot area and an occupation area rate for increasing the motor efficiency are described. The slot area is a sum of the areas for winding the windings formed by the bobbins 60 of the magnetic pole coil portions 50. As shown in FIG. 9, provided the magnetic poles of the permanent magnets increase, the thicknesses of the housing and the permanent magnets become thin. By that, the cross section, which is taken vertically in the direction of the shaft 22, of a portion formed inside the permanent magnets becomes large. As a result, the outer diameter of the armature can be made large without enlarging the outer diameter of the fuel pump. Therefore, the slot area increases as shown in FIG. 10. The number of the slots serving as the number of the magnetic pole coil portions increases with increment of the number of the magnetic poles of the permanent magnets. It is desired that the number of the slots is an even number so that a revolution force generated in the armature may be couple forces. The number of the segments of the commutator increases with increment of the number of the slots.

Figure 11:
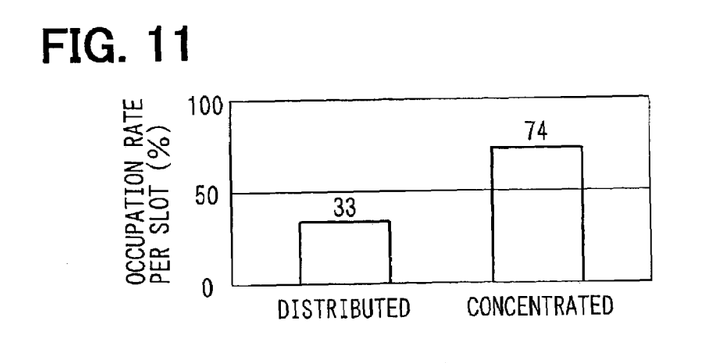
FIG. 11 is a bar graph showing a relation of the occupation area rate—a distributed winding form and a concentrated winding form.

Moreover, in this embodiment, since coils 62 are formed in the concentrated winding form, as shown in FIG. 11, the occupation area rate per slot is higher than that of the distributed winding form. In this embodiment, though the occupation area rate is 74%, and it is a high percentage, the desired occupation area rate may be more than 50%. In the fuel pump 10 having high occupation area rate, provided the outer diameters of the windings are not enlarged, the number of the wound windings can be increased. Otherwise, by enlarging the outer diameters of the windings, resistance of the coils can be decreased. Therefore, as shown in FIG. 10, provided the number of the permanent magnets increases, the motor efficiency of the fuel pump is increased. Provided the number of the permanent magnets is more than four, and the number of the slots is more than six, the motor efficiency hardly rises. Therefore, for the motor efficiency, it is desired that the number of the permanent magnets is four, and the number of the slots is six.

Figure 12:
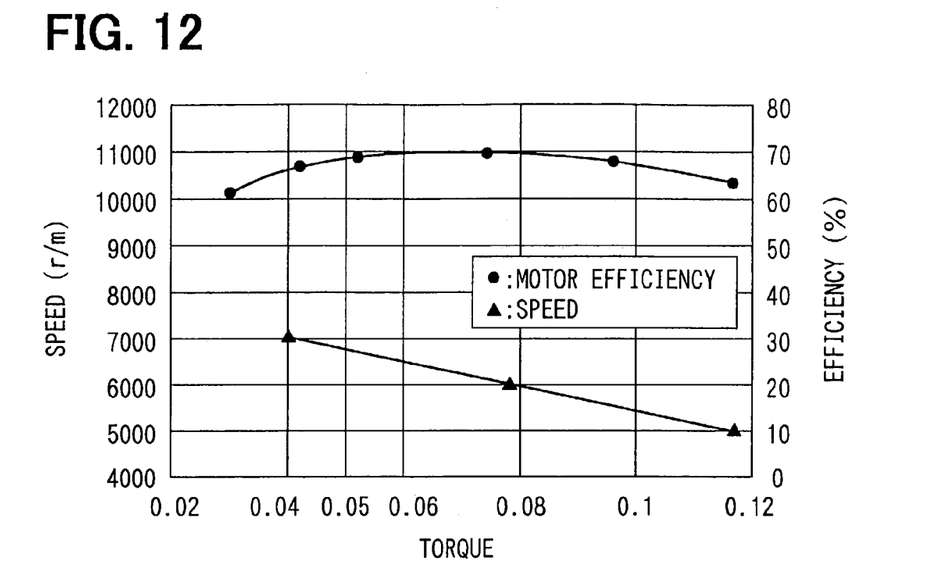
FIG. 12 is a graphic plot of the torque showing a relation of a torque—the revolution speed and motor efficiency.

In FIG. 12, in the case that the number of the permanent magnets and the number of the slots are four and six, a relation between the revolution speed and the torque of the armature, and a relation between the motor efficiency and the torque of the armature are shown. The motor efficiency is high in a torque range of 0.05–0.1 [N]. Therefore, by using four permanent magnets and six slots, the required fuel discharge pressure and the required discharge amount are satisfied, and the fuel pump having high motor efficiency is realized.

Moreover, since the permanent magnets 30 are made thin by using four permanent magnets, the inner diameters of the permanent magnets 30 are large. Furthermore, by winding the windings in the concentrated winding form, the occupation area rate increases. Therefore, in a case that the pump diameter d of the fuel pump 10 shown in FIG. 1 is not changed, even though the axial length L is shortened, and the fuel pump 10 is made flat-shaped, the predetermined torque is generated in high motor efficiency, and required fuel discharge pressure and a required fuel amount can be realized. In this embodiment, though the value of L/d is about 1.7, the value of L/d may be equal to 2.5 or lower than 2.5, and desired value of L/d is equal to 2 or lower than 2. In this way, by forming the flat-shaped fuel pump 10 without enlarging, the fuel pump 10 can be stored in the flat-shaped fuel tank easily.

Moreover, since the fuel pump 10 is made flat-shaped without enlarging its body, the diameter of an attachment slot formed in the fuel tank need not be made large to store the fuel pump. Therefore, rigidity of the fuel tank can be kept, and deformation of the fuel tank can be prevented.

Moreover, when the commutator 70 is attached to the armature 40, the terminals 74 of the segments 72 are electrically connected with the terminals 64 of the coils 62 directly. Therefore, the wirings for connecting the terminals 74 of the segments 72 with the terminals 64 of the coils 62 are needless, and the process of connecting those terminals is easy.

In this embodiment, end portions of coils 62 in opposition to the commutator 70 are connected by the terminals 80 one another, and form the parallel-connected neutral points. Since connecting points of the coils 62 are distributed to both sides of the armature 40 in the longitudinal direction of the shaft 22, a method for connecting the coils 62 is easy. Moreover, since electrical connecting points of the coils 62 are reduced by connecting the coils 62 in the star connection, the connections between the coils 62 can be performed easily.

In the first embodiment, the connecting points of the coils 62 are distributed to the both sides of the armature 40 in the longitudinal direction of the revolution shaft. However, the connections among the coils 62, and the connections between the coils 62 and the segments 72 may be performed in the commutator 70, which is one side of the armature 40 in the longitudinal direction of the revolution shaft.

[Second Embodiment, Third Embodiment]

Figure 13:
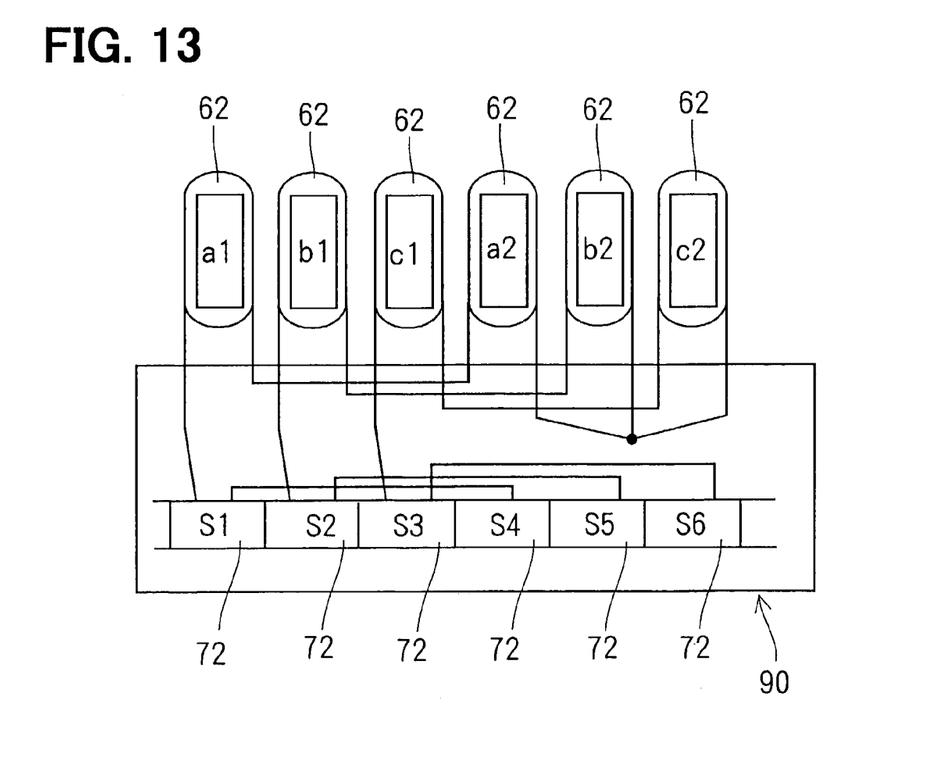
FIG. 13 is a schematic illustration showing the connections of the coils according to the second embodiment of the present invention.
Figure 14:
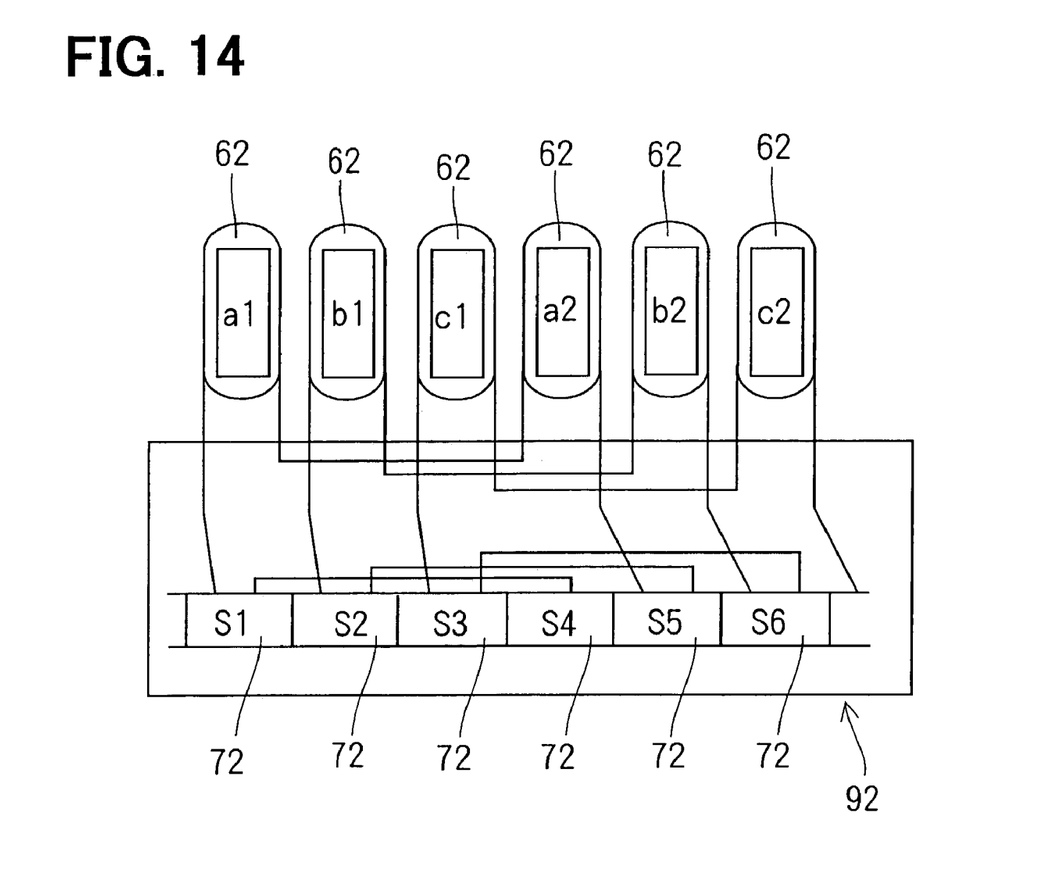
FIG. 14 is a schematic illustration showing the connections of the coils according to the third embodiment of the present invention.

Referring to FIG. 13 and FIG. 14, structures of the second embodiment and the third embodiment except for the connections between the coils 62 and the segments 72 and the connections among the coils 62 substantially correspond to those of the first embodiment. In the first embodiment, the ends of the coils 62 are connected in the side of the armature 40 in opposition to the commutator 70, i.e., in the outside of the commutator 70. On the other hand, in the second embodiment, in a commutator 90, the ends of the coils 62 and the segments 72 are electrically connected, and the other ends of the coils 62 are connected one another. In the connections of the second embodiment, after a coil (a1) 62 and a coil (a2) 62, a coil (b1) 62 and a coil (b2) 62, and a coil (c1) 62 and a coil (c2) 62 are electrically connected in series respectively. Moreover, those three pairs of the coils 62 are connected in the star connection.

In the third embodiment, in a commutator 92, the ends of the coils 62 and the segments 72 are connected, and the other ends of the coils 62 are connected one another. In the electrical connections of the coils 62, a coil (a1) 62 and a coil (a2) 62, a coil (b1) 62 and a coil (b2) 62, and a coil (c1) 62 and a coil (c2) 62 are connected in series. Moreover, the three pairs of the coils 62 are connected in a delta connection.

In the second and third embodiments, in the commutators 90 and 92 of the third embodiment, the ends of the coils 62 and the segments 72 are connected, and the other ends of the coils 62 are connected one another. In this structure, using a different commutator, in which connecting method of the coils 62 is different from that in the above commutator, the connecting method of the coils 62 can be changed.

In the above plural embodiments of the present invention as described hereinabove, four magnetic poles are formed by the permanent magnets 30 that form shapes of the quarter arcs. Therefore, when outer diameters of the fuel pumps are the same, the inner diameter of the permanent magnet 30 of the the fuel pump is larger than the inner diameter of the permanent magnets 30 of a fuel pump, which includes two magnetic poles formed by the permanent magnets forming shapes of half arcs. Moreover, since the outer diameter of the armature 40 can be large, and the spaces for the windings formed by the bobbins 60 can be large, the diameters of the windings for winding on the bobbins 60 can be large without changing the number of the wound windings. By that, the resistance of the windings can be low, and the torque generated in the armature 40 increases. Therefore, the amount of the fuel supplied from the fuel pump 10 to the engine can be increased without increasing the electric power supplied to the fuel pump.

On the other hand, when the generated torque is not increased, the number of the wound windings can be small. Therefore the inductance of the coils 62 drops. Thus, when the brushes 78 leave the segments 72 of the commutator 70, voltages generated in the coils 62 are reduced. Therefore, when the brushes 78 leave the segments 72, generations of sparks among the neighboring segments 72 or between the segments 72 and the brushes 78 can be prevented. In this way, abrasions of the segments 72 and the brushes 78 can be reduced.

Moreover, each coil core 52 is a separate body from the central core 42. Therefore, after winding the windings in the concentrated winding form, the magnetic pole coil portions 50 can be attached and fixed to the central core 42. Therefore, the winding can be wound on each bobbin 60 of each magnetic pole coil portion 50 regularly and easily. Thus, the ratio of the space occupied by the windings is improved. When the generated torque need not be increased, the spaces for the windings can be made small, and the fuel pump can be made small. By shortening the axial length of the fuel pump 10, the fuel pump 10 can be stored in the flat-shaped fuel tank easily.

In the above plural embodiments, a uniform gap along the direction of revolution is formed between the inner surfaces 31 of the permanent magnets 30 and the outer surfaces 55 of the coil cores 52. Therefore, fluctuation of the torque generated in the armature 40 is reduced. Moreover, since the clearance space 108 for storing the armature 40 inside the permanent magnets 30 rotatably serves as the fuel passage 108, a passage for the fuel flowing in the fuel pump can be ensured without enlarging the outer diameter of the fuel pump 10. Furthermore, since the fuel flows between the inside surfaces 31 of the permanent magnets 30 and the outer surfaces 55 of the coil cores 52, the contact resistance, which affects the fuel flowing in the fuel passage 108, is low, and the fuel flows smoothly.

The bobbins 60 to be wound with the windings function as magnetic insulators, which insulate the neighboring outer surfaces 54 of the coil cores 52 in the direction of revolution magnetically. Therefore, parts and man-hours for assembling the armature 40 can be reduced. In the cross section of the armature 40 taken vertically with its axis, the spaces for the windings formed by the bobbins 60 form shapes of the substantial trapezoids, which widths of the substantial trapezoids get narrow from the outer surfaces 54 toward the central core 42 respectively. The armature 40 can be composed nearly without forming gaps among neighboring magnetic pole coil portions 50 in the direction of revolution. Therefore, the bobbins 60 can be wound by the windings with using space occupied by the armature 40 efficiently. Thus, the wound windings can be increased.

In the above embodiments, the number of the magnetic poles formed by the permanent magnets 30 is defined as four, and the number of the magnetic pole coil portions 50 is defined as six. Except for them, the number of the magnetic poles formed by the permanent magnets may be two, four or the even number more than four. Moreover, it is desired that the number of the magnetic pole coil portions is larger than the number of the magnetic poles formed by the permanent magnets. Moreover, it is desired that the number of the magnetic pole coil portions is an even number, which is more by 2 than the number of the magnetic poles formed by the permanent magnets. By revolution of the impeller 20 serving as the suction force generation means, the suction force for sucking the fuel from the fuel tank is generated. In place of the impeller, systems, such as a gear pump, can be used as the suction force generation means.

What is claimed is:

1. A fuel pump for supplying fuel sucked from a fuel tank to an internal combustion engine comprising:
   permanent magnets that are installed along a circumference of a circle on an inside surface of a housing and provide different magnetic poles alternately;
   an armature installed inside the permanent magnets rotatably, and including a central core installed in a center of revolution of the armature, plural coil cores, which are magnetically coupled with the central core and installed outside the central core in a direction of revolution as a separate body from the central core, bobbins covering the coil cores respectively, and coils made by winding windings on the bobbins in a concentrated winding form, respectively;
   a commutator, which has plural segments connected with the coils electrically and revolves with the armature;
   a suction force generation means that revolves with the armature and generates a suction force for sucking the fuel from the fuel tank; and
   a cover adjacent to and covering at least one axial end surface of the armature to define a passage for fuel to flow around the armature, the cover being imperforate and covering at least an entire axial end surface of the armature on an opposite end thereof with respect to the commutator,
   wherein a gap is provided between the cover and the coils of the armature, and
   wherein a clearance space is formed between the permanent magnets and the armature, and the fuel sucked by the suction force generation means is discharged from a fuel discharge outlet through the clearance space.

2. A fuel pump according to claim 1, wherein:
   the plural coils are connected in a star connection.

3. A fuel pump according to claim 2, wherein:
   the commutator is installed on one side of the armature in a longitudinal direction of a revolution shaft, and at least one part of the each coil forms a neutral point of the star connection in the other side of the armature in the longitudinal direction of the revolution shaft.

4. A fuel pump according to claim 1, wherein:
   the plural coils are parallel-connected in the star connection.

5. A fuel pump according to claim 1, wherein:
   terminals of the commutator and the terminals of the coils are electrically connected directly.

6. A fuel pump according to claim 1, wherein:
   the number of the magnetic pole coil portions including the coil cores, the bobbins, and the coils respectively is larger by two than the number of the magnetic poles formed by the permanent magnets.

7. A fuel pump according to claim 1, wherein:
   the number of the magnetic poles formed by the permanent magnets is four or six.

8. A fuel pump according to claim 7, wherein:
   the number of the magnetic poles formed by the permanent magnets is four, and the number of the magnetic pole coil portions is six.

9. A fuel pump according to claim 1, wherein:
one of each coil core and the central core has a convex portion, and the other one has a concave portion for engaging with the convex portion.

10. A fuel pump according to claim 9, wherein: the coil cores have the convex portions in their sides opposite the central core respectively, and the central core has the concave portions for engaging with the coil cores respectively in the direction of revolution.

11. A fuel pump according to claim 9, wherein:
the convex portions and the concave portions are formed to extend in the longitudinal direction of the revolution shaft of the armature, and the convex portions are engaged with the concave portions respectively by being inserted in the concave portions along the longitudinal direction of the revolution shaft of the armature, and the widths of the convex portions get larger toward the concave portions respectively, and the widths of the concave portions get smaller toward the convex portions.

12. A fuel pump according to claim 1, wherein:
each coil core includes an outer region being opposite to each permanent magnet along the direction of revolution and a coil-winding portion extending from its outer region to the central core, and each coil core has a T-shape in a cross section of the armature taken vertically with its shaft, and each bobbin magnetically insulates the outer regions of the coil cores, which are contiguous one another in the direction of revolution.

13. A fuel pump according to claim 12, wherein:
an inside surface of each permanent magnet forms a shape of a concave arc, and an outer surface of each outer region forms a shape of a convex arc.

14. A fuel pump according to claim 13, wherein:
the fuel flows in a clearance space formed between the inside surfaces of the permanent magnets and the outer surfaces of the outer regions.

15. A fuel pump according to claim 1, wherein:
in the cross section of the armature taken vertically with its shaft, spaces for windings formed by the bobbins are formed with forming shapes of trapezoids respectively, herein the coil-winding portions are put between the trapezoids, and widths of the trapezoids get smaller from the outer regions toward the central core, respectively.

16. A fuel pump according to claim 1, wherein:
a fuel discharge pressure is in a range of 200–600 [kPa], and a discharge amount is in a range of 50–300 [L/h].

17. A fuel pump according to claim 1, wherein:
a ratio of an axial length of the pump is to an outer diameter of the pump is equal to 2.5 or lower than 2.5.

18. A fuel pump according to claim 17, wherein:
the ratio of the axial length of the fuel pump to the outer diameter of the pump is equal to 2.0 or lower than 2.0.

19. A fuel pump according to claim 1, wherein the cover comprises at least a part of the commutator.

20. A fuel pump according to claim 1, wherein the cover is located on the axial end surface of the armature opposite from the commutator.

21. A fuel pump according to claim 1, wherein the commutator has a commutator terminal that is connected with a said segment and fit with a terminal of a said coil.

22. A fuel pump for supplying fuel sucked from a fuel tank to an internal combustion engine comprising:
permanent magnets that are installed along a circumference of a circle and provide different magnetic poles alternately;
an armature installed inside the permanent magnets rotatably, and including a central core installed in the center of the revolution of the armature, plural coil cores, which are magnetically coupled with the central core, and installed outside the central core in the direction of revolution as a separate body from the central core, bobbins that cover the coil cores, and coils that are made by winding windings on the bobbins respectively;
a commutator, which has plural segments connected with the coils electrically and revolves with the armature;
a suction force generation means that revolves with the armature and generates suction force of the fuel from the fuel tank; and
a cover adjacent to and covering at least one axial end surface of the armature to define a passage for fuel to flow around the armature, the cover being imperforate and covering at least an entire axial end surface of the armature on an opposite end thereof with respect to the commutator,
wherein a gap is provided between the cover and the coils of the armature, and
wherein the number of the magnetic poles is equal to four or more than four and an even number, and magnetic pole coil portions, which include the coil cores, the bobbins and the coils respectively, are more than the magnetic poles formed by the permanent magnets.

23. A fuel pump according to claim 22, wherein the cover comprises at least a part of the commutator.

24. A fuel pump according to claim 22, wherein the cover is located on the axial end surface of the armature opposite from the commutator.

25. A fuel pump for supplying fuel sucked from a fuel tank to an internal combustion engine comprising:
permanent magnets that are installed along a circumference of a circle on an inside surface of a housing and provide different magnetic poles alternately;
an armature installed inside the permanent magnets rotatably, and including a central core installed in a center of revolution of the armature, plural coil cores, which are magnetically coupled with the central core and installed outside the central core in a direction of revolution as a separate body from the central core, bobbins covering the coil cores respectively, and coils made by winding windings on the bobbins in a concentrated winding form, respectively;
a commutator, which has plural segments connected with the coils electrically and revolves with the armature;
a suction force generation means that revolves with the armature and generates a suction force for sucking the fuel from the fuel tank; and
a cover adjacent to and covering at least one axial end surface of the armature to define a passage for fuel to flow around the armature,
wherein a clearance space is formed between the permanent magnets and the armature, and the fuel sucked by the suction force generation means is discharged from a fuel discharge outlet through the clearance space, and
wherein the cover comprises a neutral point terminal located on the axial end surface of the armature opposite from the commutator, the neutral point terminal providing a neutral point of a star connection of the coils and being fit with a terminal of the coil.

26. A fuel pump for supplying fuel sucked from a fuel tank to an internal combustion engine comprising:

permanent magnets that are installed along a circumference of a circle and provide different magnetic poles alternately;

an armature installed inside the permanent magnets rotatably, and including a central core installed in the center of the revolution of the armature, plural coil cores, which are magnetically coupled with the central core, and installed outside the central core in the direction of revolution as a separate body from the central core, bobbins that cover the coil cores, and coils that are made by winding windings on the bobbins respectively;

a commutator, which has plural segments connected with the coils electrically and revolves with the armature;

a suction force generation means that revolves with the armature and generates suction force of the fuel from the fuel tank; and a cover adjacent to and covering at least one axial end surface of the armature to define a passage for fuel to flow around the armature, wherein the number of the magnetic poles is equal to four or more than four and an even number, and magnetic pole coil portions, which include the coil cores, the bobbins and the coils respectively, are more than the magnetic poles formed by the permanent magnets, and wherein the cover is provided by a neutral point terminal located on the axial end surface of the armature opposite from the commutator, the neutral point terminal providing a neutral point of a star connection of the coils and being fit with a terminal of the coil.

* * * * *